US006836613B2

(12) United States Patent
DeSanto et al.

(10) Patent No.: US 6,836,613 B2
(45) Date of Patent: Dec. 28, 2004

(54) METHOD OF CREATING UNIFORM ADHESIVE LAYERS AND METHOD OF PRODUCING BLACK CLADDING LAYER HAVING SMALL PARTICULATE SIZE IN PLANAR OPTICAL DISPLAYS

(75) Inventors: Leonard DeSanto, Dunkirk, MD (US); Calvin Brewster, deceased, late of North Patchogue, NY (US); by Lisa Kaull, legal representative, West Bay Shore, NY (US)

(73) Assignee: Brookhaven Science Associates, Upton, NY (US)

( * ) Notice: Subject to any disclaimer, the term of this patent is extended or adjusted under 35 U.S.C. 154(b) by 156 days.

(21) Appl. No.: 10/204,573

(22) PCT Filed: Feb. 21, 2001

(86) PCT No.: PCT/US01/05353

§ 371 (c)(1),
(2), (4) Date: Dec. 24, 2002

(87) PCT Pub. No.: WO01/63324

PCT Pub. Date: Aug. 30, 2001

(65) Prior Publication Data

US 2004/0127134 A1 Jul. 1, 2004

Related U.S. Application Data

(63) Continuation-in-part of application No. 09/318,934, filed on May 26, 1999, now Pat. No. 6,301,417, and a continuation-in-part of application No. 09/318,933, filed on May 26, 1999, now Pat. No. 6,222,971, and a continuation-in-part of application No. 09/330,471, filed on Jun. 11, 1999, now Pat. No. 6,389,206, and a continuation-in-part of application No. 09/335,660, filed on Jun. 18, 1999, now Pat. No. 6,487,350
(60) Provisional application No. 60/184,122, filed on Feb. 22, 2000.

(51) Int. Cl.[7] .................. G02B 6/10; B32B 17/00; B32B 31/00

(52) U.S. Cl. .................. 385/901; 385/129; 385/131; 156/99; 156/104; 156/107

(58) Field of Search ................. 156/99, 100–104, 156/106, 107; 428/38, 426, 428; 385/129, 131, 147, 901

(56) References Cited

U.S. PATENT DOCUMENTS

| 5,980,666 A | 11/1999 | Roth et al. |
| 6,012,816 A | 1/2000 | Beiser |
| 6,033,518 A | 3/2000 | Backfisch |
| 6,535,674 B2 * | 3/2003 | Veligdan ................. 385/120 |

* cited by examiner

Primary Examiner—Hemang Sanghavi
Assistant Examiner—Omar Rojas
(74) Attorney, Agent, or Firm—Reed Smith LLP; William J. McNichol, Jr.; Matthew J. Esserman

(57) ABSTRACT

A method of creating uniform adhesive layers in a planar optical display is disclosed. The method includes providing an adhesive reservoir, providing at least two optical panels, placing spacers between the optical panels, thereby forming a stack of optical panels having at least one uniform gap between adjacent ones of the optical panels, placing the stack into a panel reservoir having a height and a width, which panel reservoir is connected to the adhesive reservoir by a fluid path, and injecting adhesive from the adhesive reservoir through the fluid path into the bottom of the panel reservoir until each uniform gap is filled. A method of producing a black cladding layer having small particulate size for use in a planar optical display is also disclosed. The method includes providing black pigment having a fine particulate size of approximately 0.05 microns, placing the particulates in solution, filtering the epoxy having the fine black particles in solution, stacking a plurality of optical panels in a fixture in the presence of the filtered epoxy, and curing the stack.

15 Claims, 5 Drawing Sheets

400

METHOD OF CREATING UNIFORM ADHESIVE LAYERS AND METHOD OF PRODUCING BLACK CLADDING LAYER HAVING SMALL PARTICULATE SIZE IN PLANAR OPTICAL DISPLAYS

CROSS REFERENCE TO RELATED APPLICATIONS

This application claims benefit of 60/184,122 filed Feb. 22, 2000.

This application is a continuation-in-part of U.S. patent application Ser. No. 09/318,934, filed May 26, 1999 now U.S. Pat. No. 6,301,417, entitled "Ultrathin Optical Panel and A Method of Making an Ultrathin Optical Panel", and incorporated herein by reference, U.S. patent application Ser. No. 09/318,933, filed May 26, 1999 now U.S. Pat. No. 6,222,971, entitled "Small Inlet Optical Panel and a Method of Making a Small Inlet Optical Panel", and incorporated herein by reference, U.S. patent application Ser. No. 09/330,471, filed Jun. 11, 1999 now U.S. Pat. No. 6,389,206, entitled "A Light Redirective Display Panel and a Method of Making a Light Redirective Display Panel", and incorporated herein by reference, and U.S. patent application Ser. No. 09/335,660, filed Jun. 18, 1999 now U.S. Pat. No. 6,487,350, entitled "A Multi-Clad Black Display Panel and a Method of Making a Multi-Clad Black Display Panel", and incorporated herein by reference.

STATEMENT REGARDING FEDERALLY SPONSORED RESEARCH OR DEVELOPMENT

Work related to this invention was partially funded pursuant to a government contract. The government has certain rights in the invention.

BACKGROUND OF THE INVENTION

1. Field of the Invention

The present invention is directed generally to planar optical displays and, more particularly, to a method of creating uniform adhesive layers in a planar optical display and a method of producing a black cladding layer having small particulate size for use in a planar optical display.

2. Description of the Background

The television, computer, and display industries are moving toward flat screens to provide pictures for entertainment, scientific, and job related activities. Planar optical displays (POD) provide pictures without the use of a picture tube, thereby allowing for flatter display screens than picture tube displays. However, planar optical displays use a black cladding layer between optical panel waveguide layers, and the cladding layer can provide limitations on screen size and resolution.

For example, uneven thickness of the cladding layer at the optical input face to the POD makes it difficult to couple the light from a rectangular image source into the POD if the POD input face is not perfectly rectangular. Variations in the thickness of the cladding layer are primarily due to variations in the particle size of the black pigment used to create the black cladding layer. In fact, a typical display screen having a thickness of 2 inches might have 0.030" to 0.040" thickness variation across its width.

Additionally, bubbles may sometimes appear in the finished output face of the POD. A bubble may show as a light spot in the output picture, or an area of reduced contrast in the output picture. Thus, such bubbles are a visible annoyance to the viewer, and are difficult to overcome, even by adding filtering layers between the viewer and the bubbles.

Finally, variability in the particle size of the black pigment particles used in the cladding layers leads to picture non-uniformities. Where carbon black or bone charcoal particles are used, the particle size can vary from 5 microns to approximately 50 microns, with an average particle size of about 40 microns. Particles of finer sizes, as small as 0.05 microns, clump together into larger particles having sizes of 5 to 10 microns when taken out of the solution into which those particles were pulverized.

Therefore, the need exists for a planar optical display that has a uniformity in the thickness of the black cladding layer, and that has a smaller particle size of the particles in the black cladding layer, while eliminating bubbles from the black cladding layer.

BRIEF SUMMARY OF THE INVENTION

The present invention is directed to a method of creating uniform adhesive layers in a planar optical display. The method includes providing an adhesive reservoir, providing at least two optical panels, placing spacers between the top edges of the optical panels and the bottom edges of the optical panels, or between the left and right sides of the optical panels, thereby forming a stack of optical panels having at least one uniform gap between adjacent ones of the optical panels, placing the stack into a panel reservoir having a height and a width, which panel reservoir is connected to the adhesive reservoir by a fluid path, and injecting adhesive from the adhesive reservoir through the fluid path into the bottom of the panel reservoir until each uniform gap is filled.

The present invention also includes a method of producing a black cladding layer having small particulate size for use in a planar optical display. The method includes providing black pigment having a fine particulate size of approximately 0.05 microns, placing the particulates in solution, filtering the epoxy having the fine black particles in solution, stacking a plurality of optical panels in a fixture in the presence of the filtered epoxy, and curing the stack.

The present invention solves problems experienced with the prior art because the variability in the uniformity due to bubbles and clumped particles of the black cladding layer is decreased by a factor of 20 through the use of the methods of the present invention, smaller particle sizes increase screen uniformity and allow for greater flatness of the POD, and the use of less black pigment, by weight, made possible by the present invention increase the optical efficiency of the POD. These and other advantages and benefits of the present invention will become apparent from the detailed description of the invention hereinbelow.

BRIEF DESCRIPTION OF THE SEVERAL VIEWS OF THE DRAWING

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical planar optical display and in a method of forming a planar optical display. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
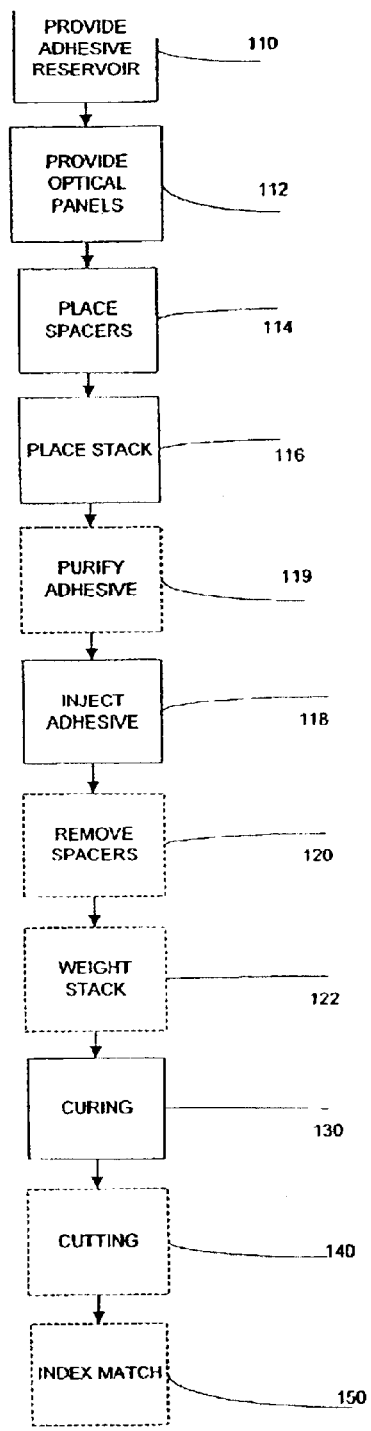
FIG. 1 is a flow diagram illustrating a method of creating uniform adhesive layers in a planar optical display.

FIG. 1 is a flow diagram illustrating a method of creating uniform adhesive layers in a planar optical display 100. The method includes the step 110 of providing an adhesive reservoir, the step 112 of providing at least two optical panels, the step 114 of placing spacers between the top edges of the optical panels and the bottom edges of the optical panels, or of inserting a retractable spacer block between adjacent sides of adjacent ones of the optical panels, thereby forming a stack of optical panels having at least one uniform gap between adjacent ones of the optical panels, the step 116 of placing the stack into a panel reservoir having a height and a width, which panel reservoir is connected to the adhesive reservoir by a fluid path, and the step 118 of injecting adhesive from the-adhesive reservoir through the fluid path into the bottom of the panel reservoir until each uniform gap is filled.

At step 110, an adhesive reservoir is provided. The adhesive reservoir is filled with adhesive for fastening adjacent optical panels together. The adhesive has a refractive index lower than that of the optical panels. In a preferred embodiment, the adhesive has refractive index of 1.43, and the optical panels have a refractive index of 1.52. One adhesive which may be used in the present invention is OG-135 manufactured by Epoxy Technology, Inc. of Billerica, Mass.

At step 112, at least two optical panels are provided. The optical panels are preferably transparent sheets, and may be formed of, for example, plexiglass. Each optical panel has a top edge, a bottom edge, a left edge, a right edge, a front face and a back face.

Figure 1A:
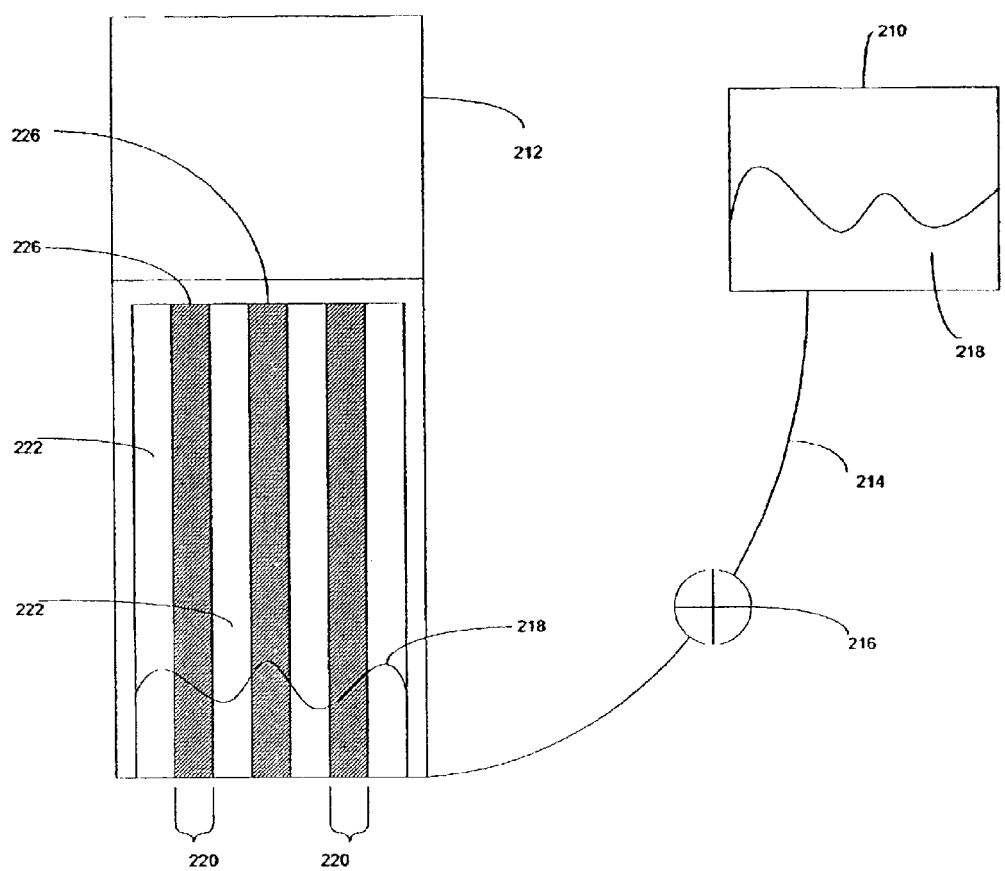
FIG. 1A is schematic illustration of the hardware used in the method of creating uniform adhesive layers in a planar optical display.
Figure 1B:
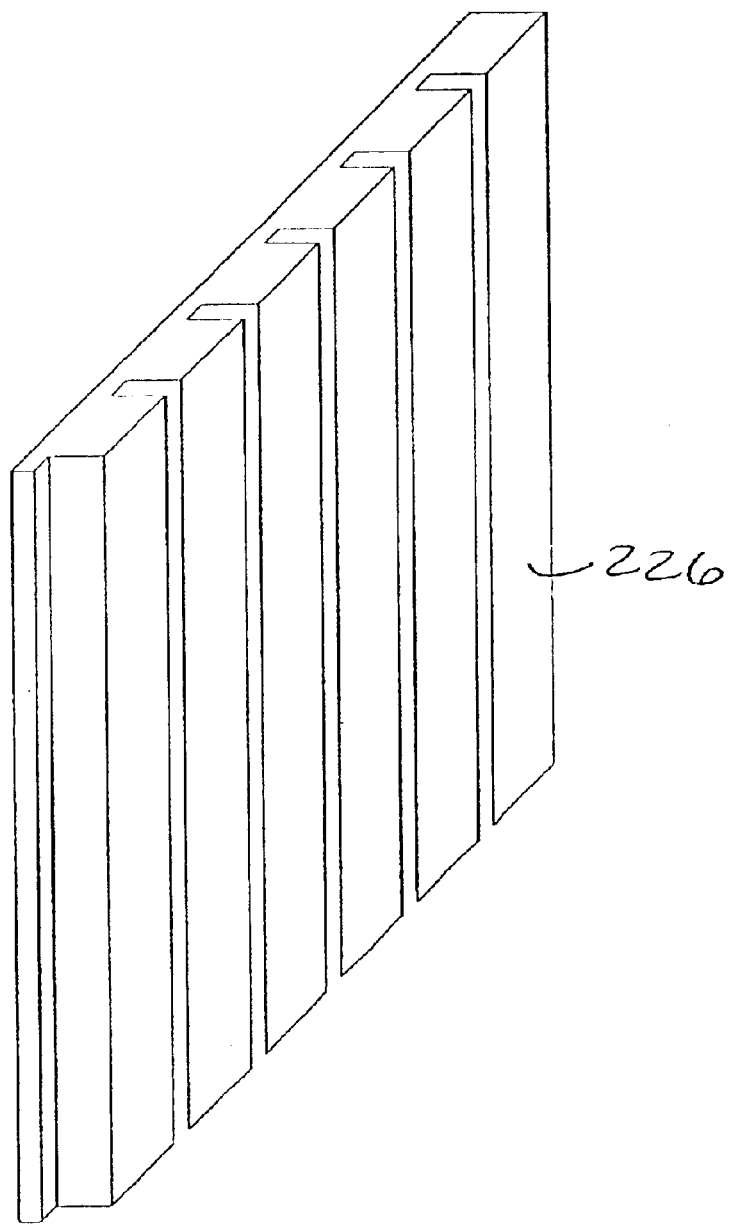
FIG. 1B is an illustration of a retractable spacer block for use in the method of creating uniform adhesive layers in a planar optical display.

At step 114, spacers are placed between the top edges of each two optical panels and the bottom edges of each two optical panels, or a retractable spacer block, as shown in FIG. 1B, is inserted between adjacent sides of adjacent ones of the optical panels. The optical panels are then stacked, with spacers between each two optical panels, thus forming a stack of optical panels having at least one uniform gap between adjacent ones of the optical panels.

At step 116, the stack of optical panels is placed into a panel reservoir. The panel reservoir must be liquid tight on all sides, and on the bottom, but may be open at the top, or may have a removable top. The panel reservoir is connected to the adhesive reservoir by a fluid path. The stack may, in one embodiment, be placed in such a manner that the at least one uniform gap is parallel to the height of the panel reservoir.

At step 118, adhesive is injected from the adhesive reservoir through the fluid path into the bottom of the panel reservoir. The liquid adhesive is injected and allowed to rise and displace the air between the panels. This injection may be pressure forced, or may be the product of gravity where the adhesive reservoir is placed at a height above the panel reservoir, and where a stop normally present in the fluid path is removed. The stop may be, for example, a valve. The injecting step is continued until each uniform gap is filled.

At optional step 119, the adhesive is further purified of bubbles and debris as it enters the gaps. This further purification may be performed, for example, by ultrasonically vibrating the stack as the adhesive is injected, by mechanically vibrating the stack as the adhesive is injected, or by applying a vacuum to the stack as the adhesive is injected, to remove all traces of air that might form bubbles. When each uniform gap is filled with adhesive, the spacers may be removed at step 120.

FIG. 1A is schematic illustration of the hardware used in the method of the present invention, up to, but not including, step 120. Referring now to FIG. 1A, the adhesive reservoir 210 is shown connected to the panel reservoir 212 by fluid path 214. Valve 216, when opened, allows adhesive 218 to flow to fill the uniform gaps 220 between each panel 222. The panels are separated by spacers 226. The spacers 226 must be of a material which will not seize to the adhesive.

FIG. 1B illustrates a retractable spacer block 230 used in one embodiment of the present invention. The retractable spacer block 230 has a plurality of raised spacers 226 mounted thereon. In one embodiment, the retractable spacer block 230 is formed of a ¼ inch thick Teflon plate, having a plurality of grooves cut therein. A retractable spacer block 230 is placed in two opposing of the four sides of the panel reservoir 212. The retractable spacer block 230 is placed to allow insertion into the volume of the panel reservoir 212, and retraction out of the volume of the panel reservoir 212. Upon insertion into the volume of the panel reservoir 212, the retractable spacer blocks 230 on opposite sides of the panel reservoir allow optical panels 222 to be stacked vertically within the opposing spacers 226, thereby creating a stack of panels 222 having a uniform gap 220 between ones of the adjacent panels. The retractable spacer block may be inserted and retracted using manual, mechanical or electrical means, as is known in the art.

Returning now to FIG. 1, at step 122, the stack may be evenly pressurized after the injecting. The stack must then be laid on its side, such that the panels are horizontal to the horizon, before pressurizing. This pressurizing squeezes excess adhesive from each uniform gap. The pressurizing may be, for example, a weighting at 1½ lbs per square inch for 8 hours in a preferred embodiment, although greater weights may be used with shorter times, or lesser weights for longer times, or different weights and times dependant on the properties of the adhesive. The weight added and time used must not cause the cladding to become too thin, however. The panels must be separated by at least 0.5 microns of cladding for proper operation.

At step 130, the adhesive is cured after completion of the injecting step 118. The curing step 130 may include, for example, heating the stack to 50 degrees Celsius for 8 hours, then to 100 degrees Celsius for 8 hours, then to 150 degrees Celsius for 8 to 12 hours, followed by a cooling of the stack for 12 hours. Other time and temperature combinations may be used, and will Vary according to the type of adhesive and type of panel used.

After curing step 130 is completed, the stack may be cut into at least two planar optical displays at step 140. In a preferred embodiment, the stack is cut diagonally to form two planar optical displays, each having an input face and an output face, at step 140.

Upon formation of the optical display or displays by the cutting at step 140, a piece of glass may be index matched to the input face of each planar optical display, and the index matched glass may be fastened to the input face using an index matched adhesive, at step 150. The thickness of the indexed matched glass may vary, but in one embodiment, the indexed matched glass has a thickness of 0.008", and the adhesive has a refractive index matching that of the glass. In one embodiment, the refractive index is 1.52. The index matching of a piece of glass to the input face of the optical panel eliminates the need to grind and optically polish the input face.

Figure 2:
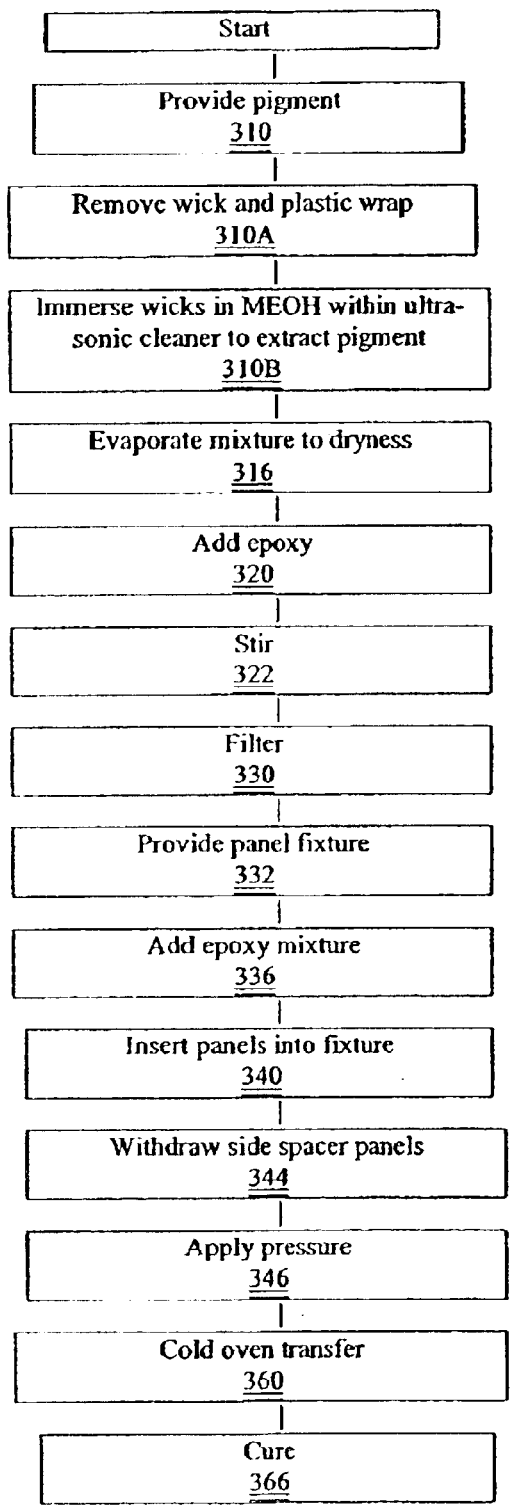
FIG. 2 is a flow diagram illustrating a method of producing a black cladding layer having small particulate size for use in a planar optical display.

FIG. 2 is a flow diagram illustrating a method of producing a black cladding layer having small particulate size for use in a planar optical display 300. The method 300 includes the step 310 of providing black pigment having a fine particulate size, step 320 of placing the particulates in solution, step 330 of filtering the epoxy, step 334 of stacking the optical panels in a fixture in the presence of the filtered epoxy, and step 366 of curing the stack.

At step 310, black pigment having particulate size in the range of 0.05 microns is provided. The black pigment may be provided, for example, by removing the black particulates from the wicks of a plurality of "magic markers", at step 310A. The wicks are placed in the presence of methanol, and placed in an ultrasonic cleaner, thereby removing the black pigment, at step 310B. In one embodiment of the present invention, this process to remove the black pigment is repeated three times. The washes of the wicks are then allowed to evaporate to dryness at step 316. Once dried, epoxy is added to the wash at step 320 and stirred at step 322, for example, with a magnetic stirrer, until the pigment from the washes is in suspension with the epoxy. In an embodiment using a magnetic stirrer, stirring may be performed for up to 1 week. Following the suspension of the washes in the epoxy at steps 320 to 322, the epoxy is filtered at step 330. In a preferred embodiment, the epoxy consists of six percent by weight of pigment at step 322. Also in a preferred embodiment, the filtering step 330 is performed through a Whatman® #1 filter paper.

Figure 3:
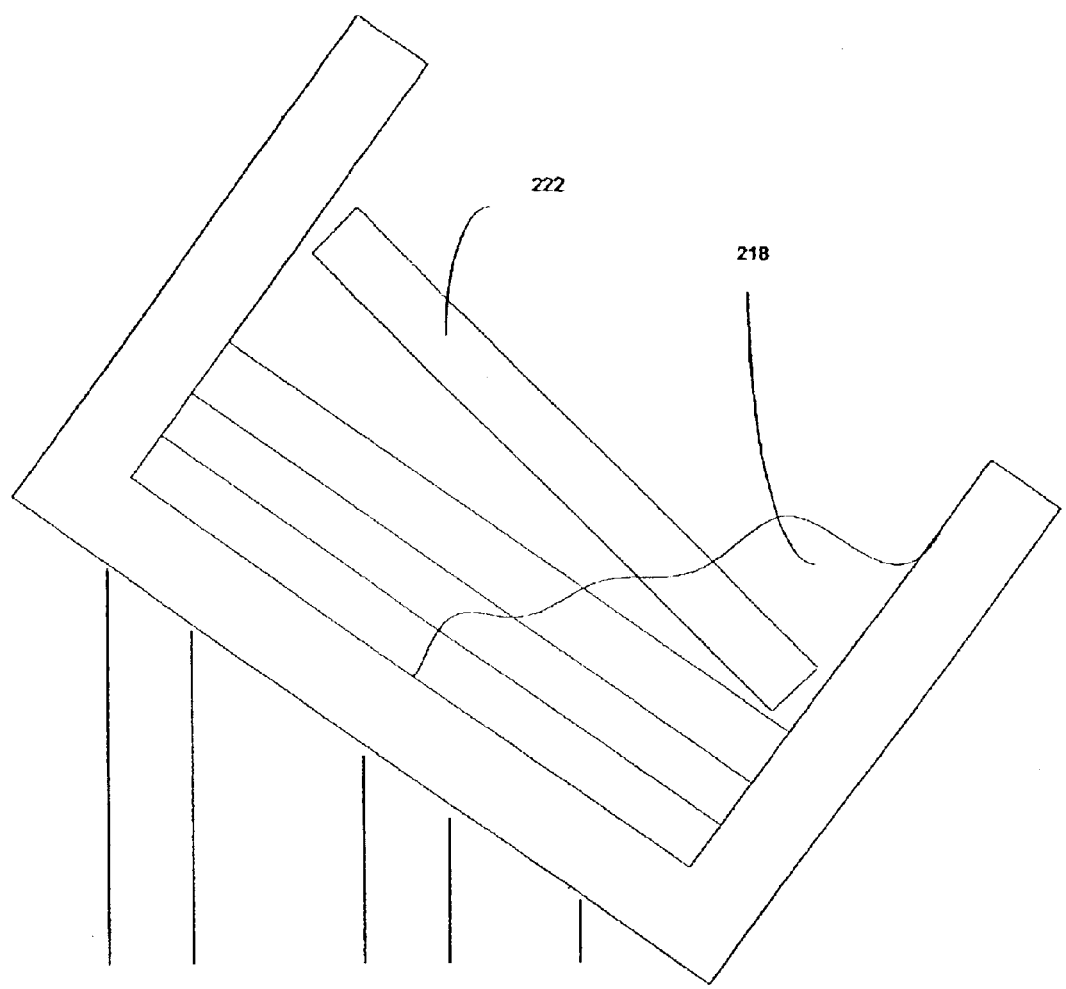
FIG. 3 is a schematic illustration of the stacking of optical panels performed in the present invention.

A fixture is provided at step 332, for stacking optical panels therein. The fixture for stacking the glass is lined with Teflon sheet. The fixture is placed on an angle when provided, and the angle is preferably about 20 degrees from the horizontal. A small amount of epoxy is then poured into the fixture, filling the lower section of the fixture to about 25%, at step 336. Optical panels are stacked at step 340, one at a time, within the fixture, by immersing the lower edge of the panel in the epoxy, while keeping the top edge raised. The top edge is then slowly lowered to force the epoxy up the incline of preferably about 20 degrees, thereby forcing air out from in between each optical panel. FIG. 3 is a schematic illustration of the stacking at steps 332, 336, and 340.

After 20 to 25 sheets of glass have been stacked, the spacers are retracted at step 344. After the stack is placed such that the optical panels are parallel to the horizon, gentle pressure may then be applied to a covering window glass placed over the stack, at step 346. The pressure may be applied by hand, or a pressure in the range of 0.5 psi may be placed on top of the window glass. Steps 340, 344, and 346 are then preferably repeated until up to 600 sheets of glass have been stacked.

Upon completion of the stack, the fixture, containing the stack therein, is preferably transferred to a cold oven at step 360, and pressure in the range of 1.5 psi may be added equally across the stack at step 362. The stack is then cured at step 366. Curing may include, for example, keeping the weighted fixture in the oven at ambient temperature for 24 hours, baking the stack in the oven at 50 degrees centigrade for about 16 hours, baking the stack at 100 degrees centigrade for 24 hours, and then baking the stack at 150 degrees for 24 hours. The stack is then allowed to cool to room temperature.

Those of ordinary skill in the art will recognize that many modifications and variations of the present invention may be implemented. The foregoing description and the following claims are intended to cover all such modifications and variations.

What is claimed is:

1. A method of creating uniform adhesive layers in a planar optical display, comprising:
    providing an adhesive reservoir;
    providing at least two optical panels, wherein each optical panel has a top edge, a bottom edge, a left edge, and a right edge, and wherein each optical panel has a front face and a back face;
    spacing between two optical panels, thereby forming a stack of optical panels having at least one uniform gap between adjacent ones of the optical panels;
    placing the stack into a panel reservoir having a height and a width, which panel reservoir is connected to the adhesive reservoir by a fluid path;
    injecting adhesive from the adhesive reservoir through the fluid path into the bottom of the panel reservoir; and
    continuing said injecting until each uniform gap is filled.

2. The method of claim 1, further comprising removing the spacing after said continuing said injecting.

3. The method of claim 1, further comprising evenly pressurizing the stack after said continuing said injecting, thereby squeezing excess adhesive from each uniform gap.

4. The method of claim 3, wherein said evenly pressurizing is at 1½ lbs per square inch for 8 hours.

5. The method of claim 1, further comprising curing the adhesive after said continuing said injecting.

6. The method of claim 5, wherein said curing comprises heating the stack to 50 degrees Celsius for 8 hours, then to 100 degrees Celsius for 8 hours, then to 150 degrees Celsius for 8 to 12 hours, and then cooling the stack for 12 hours.

7. The method of claim 5, further comprising cutting the stack into at least two planar optical displays after said curing.

8. The method of claim 1, further comprising ultrasonically vibrating the stack after said placing.

9. The method of claim 1, further comprising mechanically vibrating the stack after said placing.

10. The method of claim 1, further comprising applying a vacuum to the stack after said placing.

11. The method of claim 1, wherein the adhesive has refractive index lower than that of the optical panel.

12. The method of claim 11, wherein the refractive index of the optical panel is 1.52 and the refractive index of the adhesive is 1.43.

13. The method of claim 1, further comprising forming two planar optical displays, each having an input face and an output face, from the stack by cutting the stack diagonally.

14. The method of claim 13, wherein said forming includes index matching a piece of glass to the input face of each planar optical display, and fastening the indexed matched glass to the input face using an index matched adhesive.

15. A method of producing a black cladding layer having small particulate size for use in a planar optical display, comprising:

providing black pigment having particulate size in the range of 0.05 microns by removing black particulates from a plurality of markers in the presence of methanol using an ultrasonic cleaner;

evaporating the black pigment to dryness at step;

adding epoxy to the dried black pigment to form a black epoxy mixture;

stirring the black epoxy mixture;

filtering the black epoxy mixture after said stirring;

partially filling a fixture with the black epoxy mixture after said filtering;

stacking a plurality of optical panels in a fixture, wherein the fixture is placed on an angle, and wherein said stacking is performed by immersing a lower edge of each of the plurality of optical panels in the black epoxy mixture, while keeping a top edge of each of the plurality of optical panels raised, then slowly lowering the top edge to force the black epoxy mixture up the angle;

providing equal pressure along a completed stack; and curing the stack.

* * * * *